Patented Dec. 13, 1949

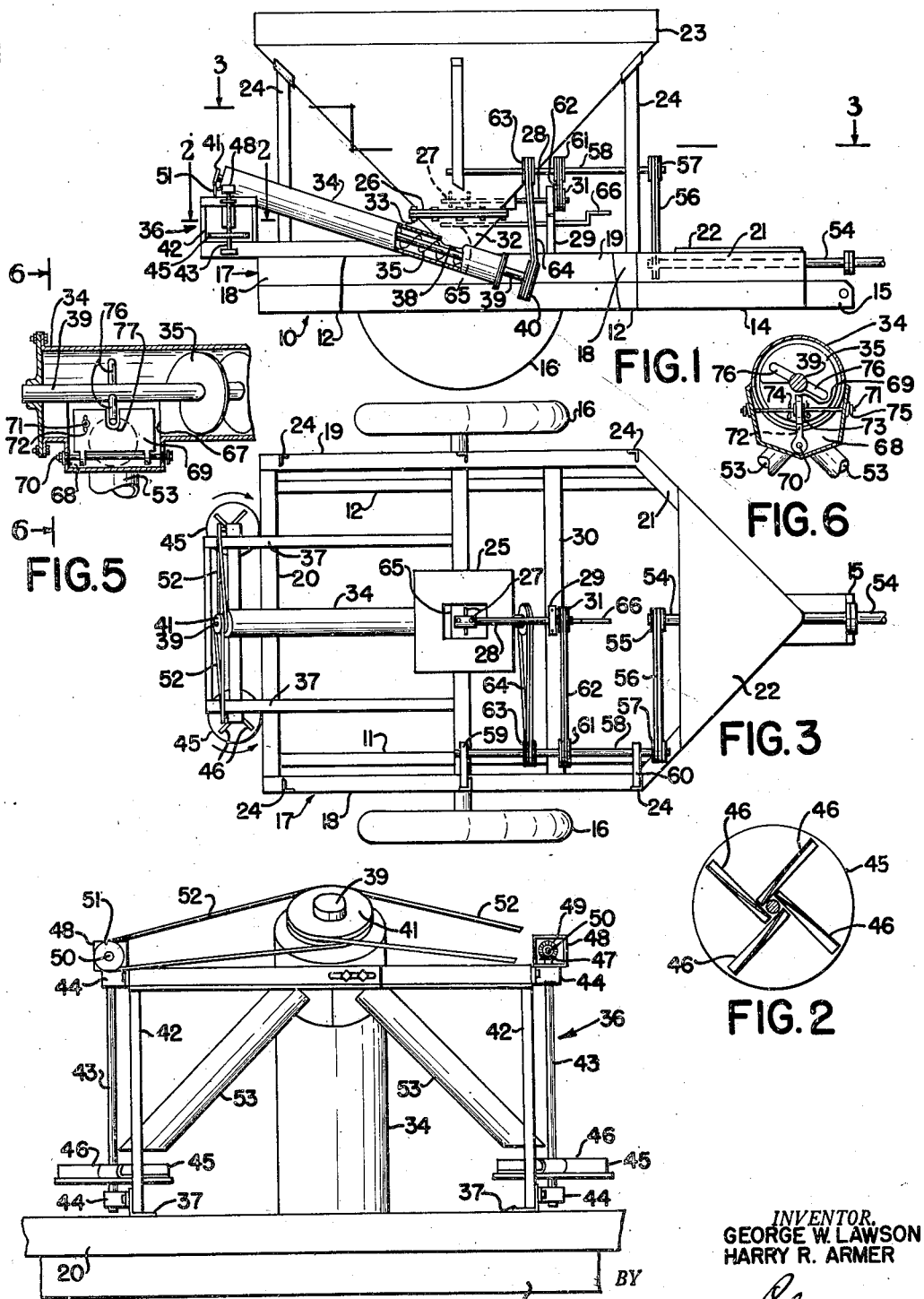

2,490,971

UNITED STATES PATENT OFFICE 2,490,971

DISTRIBUTING MACHINE

George W. Lawson and Harry R. Armer, Houston, Tex.

Application February 24, 1947, Serial No. 730,628

3 Claims. (Cl. 275—8)

This invention relates to a distributing machine for the broadcasting of seed grain, fertilizer and the like.

A principal object of the present invention is to provide a distributing machine of relatively simple construction which is adapted for the efficient broadcasting of seed grain, fertilizer and the like in large quantities and at high rates.

Another important object is the provision of a distributing machine employing a compact arrangement of a hopper, screw conveyor and distributing fans for improved broadcasting efficiency.

Other and more specific objects and advantages of this invention will be apparent from the following detailed description when read in conjunction with the accompanying drawings which illustrate one embodiment in accordance with this invention.

In the drawings:

Fig. 1 is a side elevation of a distributing machine in accordance with this invention having some of the parts thereof broken away for purposes of illustration;

Fig. 2 is a plan view of one of the distributing fans taken generally along line 2—2 of Fig. 1;

Fig. 3 is a plan view of the distributing machine taken generally along line 3—3 of Fig. 1;

Fig. 4 is a rear end elevation of a portion of the machine showing some of the details of the broadcasting mechanism;

Fig. 5 is a longitudinal sectional view through the discharge end of the screw conveyor forming a part of the machine; and Fig. 6 is a cross-sectional elevation along line 6—6 of Fig. 5.

The machine, in accordance with the illustrative embodiment of this invention, comprises a vehicular frame 10, of generaly rectangular form, having a pair of parallel side rails 11 and 12, a rear cross-member 13 and a V-shaped front-end member 14 to which is connected a draw bar connection 15 for the attachment thereto of a conventional power-operated tractor or truck (not shown). Frame 10 is mounted on a pair of wheels 16—16, for easy mobility. Mounted on frame 10 is an auxiliary frame 17 which supports the hopper and distributing members of the machine, to be described in greater detail hereinafter. Auxiliary frame 17 is of the same general configuration as frame 10, being composed of parallel side rails 18 and 19, a rear end cross member 20 and a V-shaped front end-member 21. The front portion of the latter is covered with a metal deck plate 22 which serves as a platform for an operator for the machine. A hopper 23, of generally pyramidal shape, is mounted in inverted position on auxiliary frame 17, with its apex positioned substantially centrally of the frame, being rigidly supported in this position by means of uprights 24, extending from side rails 18 and 19 to the adjacent corners of the hopper. The apex of the hopper is cut off, providing a square opening 25 to form the hopper discharge, which is provided with a laterally extending concentric bolt flange 26. An agitator 27 is mounted for rotation in the lower part of hopper 23 adjacent opening 25 on a shaft 28 extending horizontally through a front side wall of the hopper. The outer end portion of shaft 28 is journalled in a pillow block 29 supported on a cross member 30 of the auxiliary frame, and has a peripherally grooved pulley 31 rigidly mounted thereon through which power is supplied for rotating agitator 27, in a manner to be described hereinafter.

Connected to opening 25 in the bottom of the hopper is a hollow discharge connection 32, which is of the same general pyramidal configuration as the hopper, having its base portion provided with a flange 33 matching flange 26 for attachment thereto by suitable bolt means. The apex of connection 32 communicates with the interior of a tubular conveyor housing 34, being rigidly connected adjacent one end thereof, as by welding at 35. Conveyor housing 34 extends from a point beneath connection 32 upwardly and rearwardly, and substantially centrally of frame 17 to a point beyond the rear of frames 10 and 17. The described rigid connection between discharge connection 32 and conveyor housing 34 forms these members into a unitary structure which permits of the ready attachment or removal of the discharge elements of the machine, when it is desired to substitute some other type of discharge connection therefor to permit use of the hopper structure and machine for some other purpose around the farm.

The rearwardly extending end of conveyor housing 34 is supported on the upper edge of an open box-like distributor frame, designated generally by the numeral 36, mounted across and beyond the rear end of frame 17, being supported therefrom on a pair of parallel laterally spaced rails 37—37 which are rigidly connected to frame 17. A screw conveyor 38 is rotatably mounted within housing 34 on a shaft 39 which extends axially through housig 34 and projects from the closed opposite ends thereof. The end of shaft 39 which projects from the inlet end of conveyor housing 34 has mounted thereon a peripherally grooved pulley 40 which is employed for driving shaft 39 and screw conveyor 35 in a manner to be described hereinafter. The opposite end of shaft 39 projecting from conveyor housing 34 is provided with a drive pulley 41 which has a pair of peripheral grooves, which are employed for driving the distributing fans in a manner also to be described hereinafter.

A discharge opening 67 (see Figs. 5 and 6) is provided in the lower surface of conveyor housing 34 near the discharge end thereof and is enclosed within a generally V-shaped discharge chamber 68, the side walls of which converge below the conveyor housing along a line parallel to the axis of housing. A pair of discharge nozzles 53—53 communicate with the interior of conveyor housing 34 on opposite sides of the center thereof through the side walls of chamber 68. A flat rectangular plate 69 is mounted vertically between the side walls of discharge chamber 68, forming a longitudinally extending baffle therein between the openings to nozzles 53—53. Baffle 69 is mounted on a shaft 70 rigidly connected to its lower edge and having its ends journalled in the end walls of discharge chamber 68, whereby baffle 69 may be rotated to either side of the center line of the conveyor housing for adjusting the relative quantities of material being discharged from each of the nozzles 53—53. The swing of baffle 69 from side to side is adjustable by means of an adjusting rod 71 which extends horizontally through discharge chamber 68, passing through an elongated slot 72 in one end of baffle 69. A pair of washers 73—73 are loosely mounted on rod 71 on opposite sides of baffle 69 and are held in position by cotter keys 74—74 extending through rod 71 on the outside of washers 73. The outer ends of rod 71 are threaded and carry adjusting nuts 75—75 by means of which the angular position of baffle 69 may be adjusted and held in the adjusted position. The portion of conveyor shaft 39 between the end of conveyor housing 34 and the end of screw conveyor 35, which is shorter than the housing, is provided with a plurality of radially extending pins 76—76 which serve as an agitating device for breaking up any relatively large lumps of the material being delivered by conveyor 35 to discharge chamber 68. A slot 77 is cut through the upper edge of baffle 69 to permit passage therethrough of agitator pins 76 as they rotate with shaft 39.

Distributor frame 36 includes upstanding end frame members 42 of open rectangular form on the outsides of which are mounted vertically disposed fan shafts 43, journalled in vertically spaced bearings 44—44 which are suitably mounted on frame members 42. A circular distributing fan 45 is horizontally mounted on each of shafts 43 near the lower ends thereof for rotation by the shafts. The upper faces of the fans have mounted thereon a plurality of radially extending distributing blades 46, curved in cross section and having their concave surfaces facing in the direction of rotation of the fans. The upper ends of fan shafts 43 are provided with pinions 47 which are enclosed within gear boxes 48 wherein they are engaged with matching pinions 49 mounted on horizontal shafts 50 journalled in the walls of gear boxes 48 and extending through the rear faces thereof. The extending ends of pinion shafts 50 carry peripherally grooved pulleys 51, each of which is connected by a conventional V-belt 52 to one of the grooves in pulley 41, the gearing arrangements and belt drives to each of the fan shafts 43 being so arranged as to cause fans 45 to rotate in opposite directions, as indicated by the arrows in Fig. 3. Discharge nozzles 53—53 have their outlet ends arranged to discharge onto the upper surfaces of fans 45 over an area generally inwardly of the center of the fans.

A power shaft 54, which is adapted to be connected to a suitable power source (not shown) such as a power take-off of the tractor or truck employed to pull the distributing machine, extends axially of frame 17 through the front member 21 and beneath deck plate 22, being suitably journalled on the frame for rotation in any conventional manner (not shown). The inner end of power shaft 54 carries a V-pulley 55, which is connected by a V-belt 56 to a drive pulley 57 mounted on a horizontal countershaft 58 journalled in brackets 59 and 60 mounted on uprights 24 at a level spaced above frame 17. Countershaft 58 carries one drive pulley 61 which is drivingly connected by a V-belt 62 to pulley 31 mounted on the agitator shaft 28. Countershaft 58 also carries a second drive pulley 63 which is drivingly connected by a V-belt 64 to pulley 40 mounted on screw conveyor shaft 39. A slide valve 65 is mounted within discharge connection 32 and is movable therein to control the passageway leading therefrom into conveyor housing 34. Slide valve 65 is provided with an operating handle 66 which extends horizontally through the forward side of connection 32 toward the platform formed by deck plate 22.

The distributing machine above described is employed in the following manner: Hopper 23 is filled with seed grain, fertilizer or the like which is to be broadcast over a field and draw bar 15 of the machine is connected to a suitable truck or tractor which is to pull the machine over such a field. At the same time power shaft 54 is suitably connected to a power-take-off or other suitable power source normally located on the attached truck or tractor. The controls for connecting and disconnecting the power source to power shaft 54 will normally be on the pulling tractor or truck and under the control of the operator thereof. When the machine is in motion, power shaft 54 will be started rotating and slide valve 65 will be manipulated to regulate the rate of discharge of material from hopper 23 through discharge connection 32 into conveyor housing 34. Power will be transmitted from power shaft 54 through belt drive 56 to counter shaft 58 which will, in turn, drive conveyor shaft 39 through belt drive 64. Material fed from hopper 23 will be conveyed by means of screw conveyor 35 to the discharge end of the conveyor housing from which it will be discharged through nozzles 53—53 onto the upper surfaces of fans 45. The latter will, at the same time, be rotating through the driving connection of belts 52—52 between the gear box pulleys 51—51 and pulley 41 mounted on the end of conveyor shaft 39. The material being discharged on the upper surfaces of fans 45 will be thrown therefrom by centrifugal force developed by their rotational speed, the curved surfaces of blades 46 acting as discharge nozzles to impart greater velocity to the material being broadcast. The direction of rotation of the fans will throw the material rearwardly of the machine and over wide over-lapping arcs, the radial distance of the cast being dependent upon the speed of rotation of the fans.

As the material feeds from hopper 23, agitator 27 will be rotated by the driving connection to countershaft 58 formed by belt drive 62, and agitator pins 76 will be rotated by rotation of shaft 39, and these agitators will serve to break up any lumps in the material feeding from the hopper and to the discharge nozzles, so that relatively uniform sized particles will pass into and out of conveyor housing 34 and thus improve the uniformity of the distribution when the material reaches the broadcasting fan. As the material discharges from the end of screw conveyor 35 into discharge chamber 68, uniformity in the quantities of material entering each of the nozzles 53 may be assured by suitable adjustment of baffle plate 69, thus further assuring even distribution of the material by the broadcasting fans.

With a machine of the character described, a field of large area may be seeded or treated in a relatively short time and the material to be distributed will be broadcast in a very uniform and efficient pattern which will greatly reduce wastage of material and effect large reductions in men, machines and time heretofore required for seeding or fertilizing similar areas.

Various changes and modifications may be made in the details of the machine in accordance with this invention without departing from the scope of the appended claims.

What we claim and desire to secure by Letters Patent is:

1. In a distributing machine of the class described including a hopper mounted on a mobile frame and a pair of distributing fans rotatably mounted at the rear of said frame, a feed unit for transferring material from said hopper to said distributing fans, comprising, a tubular casing closed at its opposite ends and adapted to extend rearwardly from beneath the mouth of said hopper to a point above and between said distributing fans, a discharge conduit detachably connected to the mouth of said hopper and rigidly connected to the adjacent end of said casing, a screw conveyor enclosed within said casing and rotatable therein by an axial shaft extending through the opposite ends of said casing, a discharge opening in the lower wall of said casing adjacent the discharge end thereof, a housing enclosing said opening and depending from said casing, a pair of discharge nozzles communicating with the interior of said housing and diverging therefrom toward the upper surfaces of said distributing fans, a movable baffle plate disposed axially of said housing between said nozzles and swingable relative to the nozzle openings in said housing, a drive connection carried by the rearward end of said shaft for driving connection to said distributor fans, and a drive connection on the opposite end of said shaft for connection of a power source thereto.

2. In a distributing machine of the class described including a hopper mounted on a mobile frame and a pair of distributing fans rotatably mounted at the rear of said frame, a feed unit for transferring material from said hopper to said distributing fans, comprising, a tubular casing closed at its opposite ends and adapted to extend rearwardly from beneath the mouth of said hopper to a point above and between said distributing fans, a discharge conduit detachably connected to the mouth of said hopper and rigidly connected to the adjacent end of said casing, a screw conveyor enclosed within said casing and rotatable therein by an axial shaft extending through the opposite ends of said casing, a discharge opening in the lower wall of said casing adjacent the discharge end thereof, a housing enclosing said opening and depending from said casing, a pair of discharge nozzles communicating with the interior of said housing and diverging therefrom toward the upper surfaces of said distributing fans, a movable baffle disposed axially of said housing between said nozzles and swingable relative to the nozzle openings in said housing, an agitator mounted on said shaft adjacent said opening in said casing, a drive connection carried by the rearward end of said shaft for driving connection to said distributor fans, and a drive connection on the opposite end of said shaft for connection of a power source thereto.

3. In a distributing machine of the class described including a hopper mounted on a mobile frame and a pair of distributing fans rotatably mounted on the rear of said frame, a feed unit for transferring material from said hopper to said distributing fans, comprising, a tubular casing closed at its opposite ends and adapted to extend rearwardly from beneath the mouth of said hopper to a point above and between said distributing fans, a discharge conduit detachably connected to the mouth of said hopper and rigidly connected to the adjcent end of said casing, a valve member slidably disposed in said conduit for controlling the flow of material from said hopper to said casing, a screw conveyor enclosed within said casing and rotatable therein by an axial shaft extending through the opposite ends of said casing, a discharge opening in the lower wall of said casing adjacent the discharge end thereof, a housing enclosing said opening and depending from said casing, a pair of discharge nozzles communicating with the interior of said housing and diverging therefrom toward the upper surfaces of said distributing fans, a movable baffle plate disposed axially of said housing between said nozzles and swingable relative to the nozzle openings in said housing, an agitator mounted on said shaft adjacent said opening in said casing, a drive connection carried by the rearward end of said shaft for driving connection to said distributor fans, and a drive connection on the opposite end of said shaft for connection of a power source thereto.

GEORGE W. LAWSON.
HARRY R. ARMER.

REFERENCES CITED

The following references are of record in the file of this patent:

UNITED STATES PATENTS

| Number | Name | Date |
| --- | --- | --- |
| 797,253 | Banister | Aug. 15, 1905 |
| 915,661 | Covington | Mar. 16, 1909 |
| 1,011,071 | Mehlberger | Dec. 5, 1911 |
| 1,623,001 | Gollbach | Mar. 29, 1927 |
| 2,099,369 | Lutz | Nov. 16, 1937 |
| 2,281,212 | Stoltzfus | Apr. 28, 1942 |
| 2,323,262 | Warren | June 29, 1943 |
| 2,334,376 | Bauer | Nov. 16, 1943 |

FOREIGN PATENTS

| Number | Country | Date |
| --- | --- | --- |
| 19,589 | France | Dec. 28, 1914 |//
| | (Addition to 472,464) | |